United States Patent [19]

Ueda

[11] 3,792,949

[45] Feb. 19, 1974

[54] BOTTLING SYSTEM

[75] Inventor: Kazuo Ueda, Tokyo, Japan

[73] Assignee: Shikoku Kakooki Co., Ltd., Tokushima, Japan

[22] Filed: Mar. 2, 1972

[21] Appl. No.: 231,286

[52] U.S. Cl. ............... 425/242, 221/237, 221/265, 425/317
[51] Int. Cl. ............................................. B29f 1/00
[58] Field of Search.. 425/DIG. 210, DIG. 203, 317, 425/242; 221/265, 237

[56] References Cited
UNITED STATES PATENTS

| | | | |
|---|---|---|---|
| 2,652,916 | 9/1953 | Mason | 221/265 X |
| 3,194,857 | 7/1965 | White | 425/DIG. 210 |
| 3,543,909 | 12/1970 | Veda | 198/212 X |
| 3,562,372 | 2/1971 | Schjeldahl et al. | 425/DIG. 203 |
| 3,590,426 | 7/1971 | Nowicki | 425/DIG. 203 |

*Primary Examiner*—Richard B. Lazarus
*Attorney, Agent, or Firm*—George B. Oujevolk

[57] ABSTRACT

A bottling system comprising a molding machine for producing synthetic resin bottles, a bottle aligning machine for continuously receiving the bottles and sending them successively out in a row in an upright position, a bottling machine to be supplied with the bottles from the bottle aligning machine for filling the bottles, a printing machine disposed in the path of travel of the upright bottles for printing the bottles, and a capping machine such as a heat sealer for capping the filled bottles.

1 Claim, 9 Drawing Figures

BOTTLING SYSTEM

BACKGROUND OF THE INVENTION

The present invention relates to a system for producing synthetic resin bottles by molding and filling the bottles with milk or an acidophilus beverage to provide a prepared bottled product, a portion of the system being described in the Ueda U.S. Pat. No. 3,543,909.

For the production of bottled beverages, it has been a general practice to collect empty bottles after use and filling the bottles with milk or a beverage after cleansing. However, such a method is troublesome in that labor is required for collection and cleansing.

SUMMARY OF THE INVENTION

In accordance with this invention, bottles of synthetic resin are manufactured by a molding machine and sent to an aligning machine from which they are taken out in the upright position and then fed into a bottling machine one after another. Accordingly, the overall operation starting with the molding of the bottles is carried out smoothly and continuously. Moreover, since a row of upstanding bottles are sent out from the aligning machine and led to the printing machine by a conveyor line for printing on the side of the bottle, the invention has the advantage that commercial products are obtained with printing provided thereon.

The present invention will be described in greater detail with reference to the accompanying drawings.

DETAILED DESCRIPTION

Figure 1:
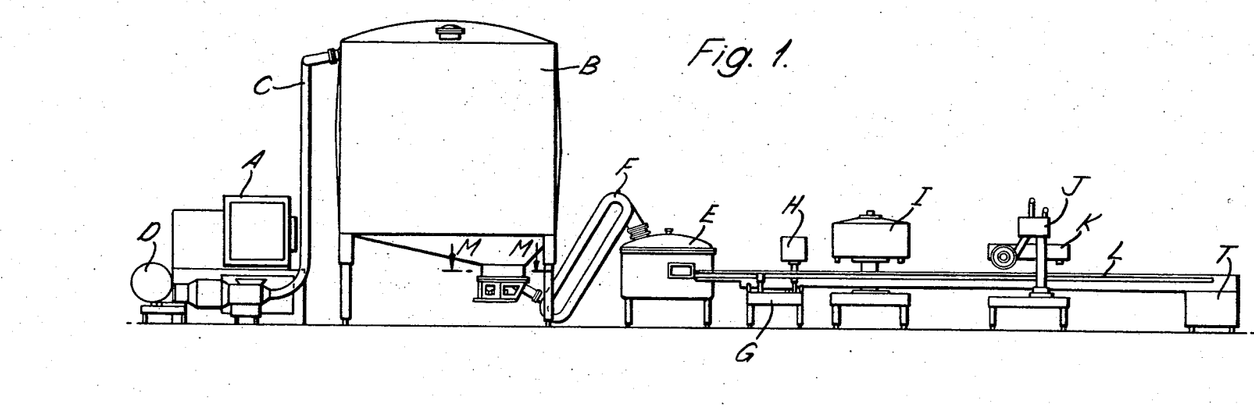
FIG. 1 is a diagramatic side elevation showing a longitudinal extended view of the entire system for the manufacturing process according to the present invention.

With reference to the drawings, the system of this invention will be described below. FIG. 1 shows a hollow injection molding machine A, a storage tank B, an air chute C by which bottles produced by the molding machine are sent into the storage tank B, a blower D therefor, a bottle aligning machine E, a completely sealed bucket conveyor F for transferring the bottles from the storage tank B to the bottle aligning machine E, a printing press G, a control panel H for controlling the amount of the bottles to be fed to a bottling machine I, a cap forming machine J, a heat sealer K for capping, a bottle collecting table T, and a conveyor L extending from the bottle aligning machine E to the bottle collecting table T.

In the above arrangement, the bottles formed by the molding machine A are sent into the storage tank B, from which they are continuously charged into the bottle aligning machine E at a constant rate. The bottles are then sent out from the aligning machine E in a row with their mouth up and thereafter carried to the printing press G where printing is placed on the side surface of the bottles. This is followed by filling on the bottling machine I, and capping by the heat sealer K. Finally the bottles are collected on the table T. The storage tank B assures the supply of a constant quantity of bottles to the aligning machine E even when the molding machine A is out of operation for inspection and maintenance. The printing press G may be disposed at a desired position along the conveyor path L for a row of the upstanding bottles which extends from the aligning machine E to the bottle collecting table T.

Among all the components shown in the above-mentioned manufacturing process, the control panel H and a few other components are already known and used for preparing bottled products. The present invention is particularly directed to the flow of the bottles starting with the bottle forming by the hollow injection molding machine A and terminating with the operation on the bottle aligning machine E. Since the hollow injection molding machine A per se is also known in the art, the following description will be directed to the storage tank B and the bottle aligning machine E which are especially used for practicing the process of this invention.

Figure 2:
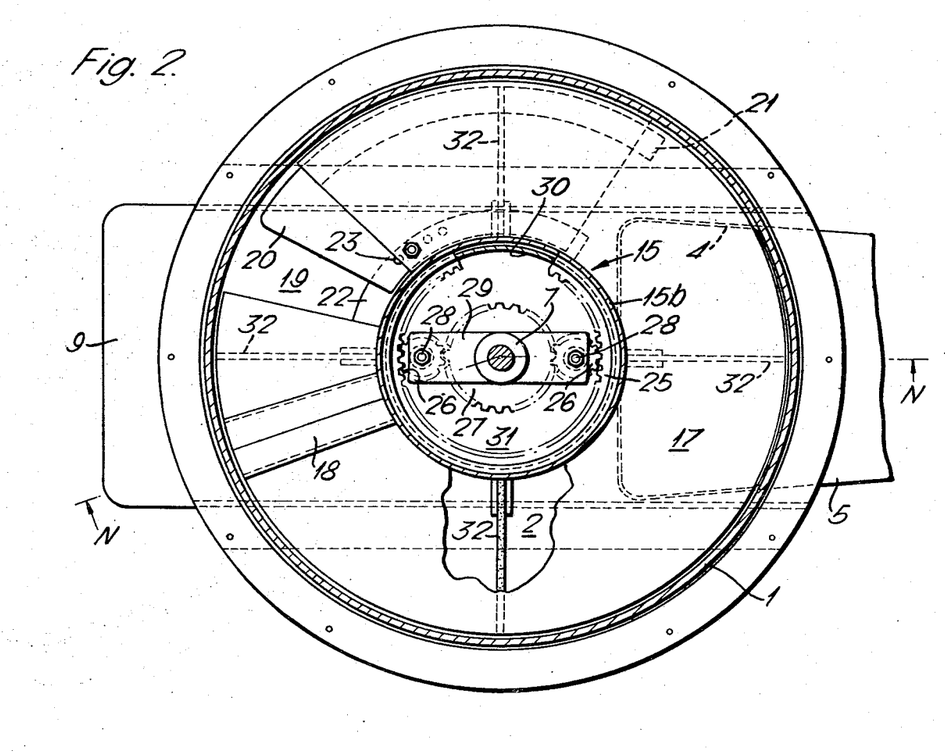
FIG. 2 shows a discharge device for a storage tank and is an enlarged view in section taken along the line M—M in FIG. 1.
Figure 3:
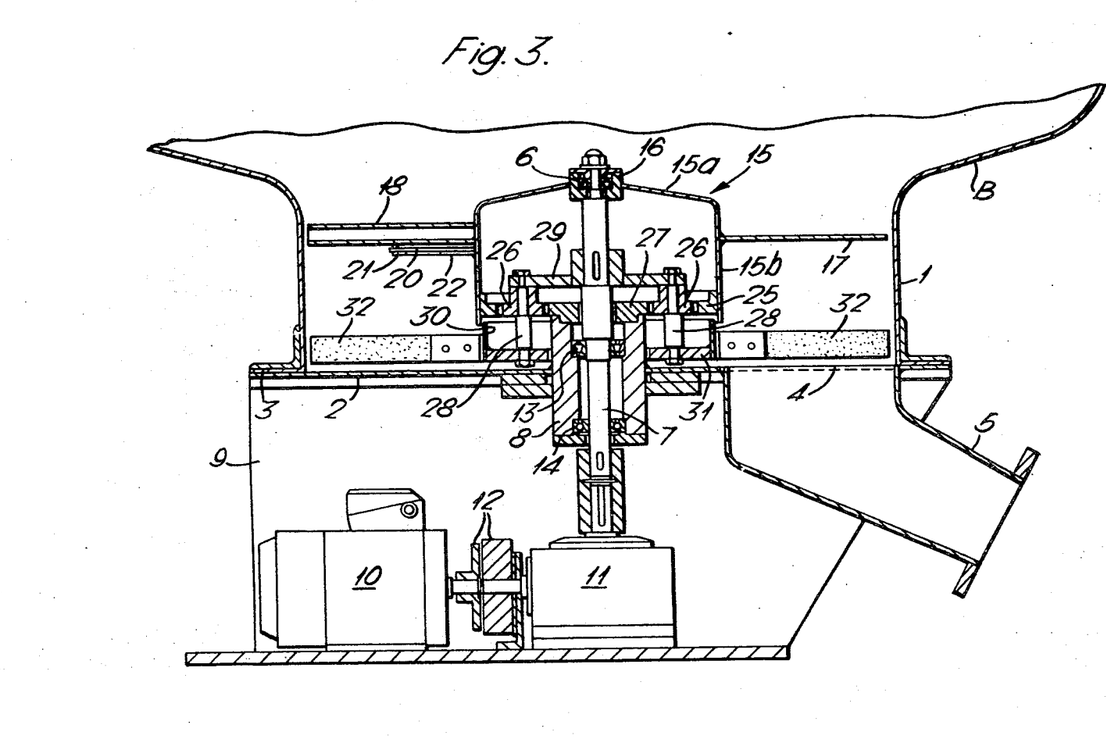
FIG. 3 is a sectional view taken along the line N—N in FIG. 2.
Figure 4:
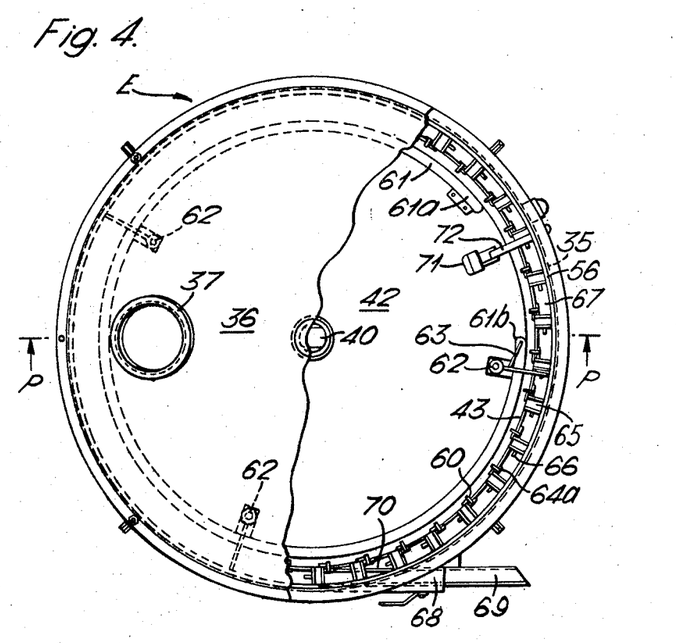
FIG. 4 shows a plan view with part broken away of a bottle aligning machine.
Figure 5:
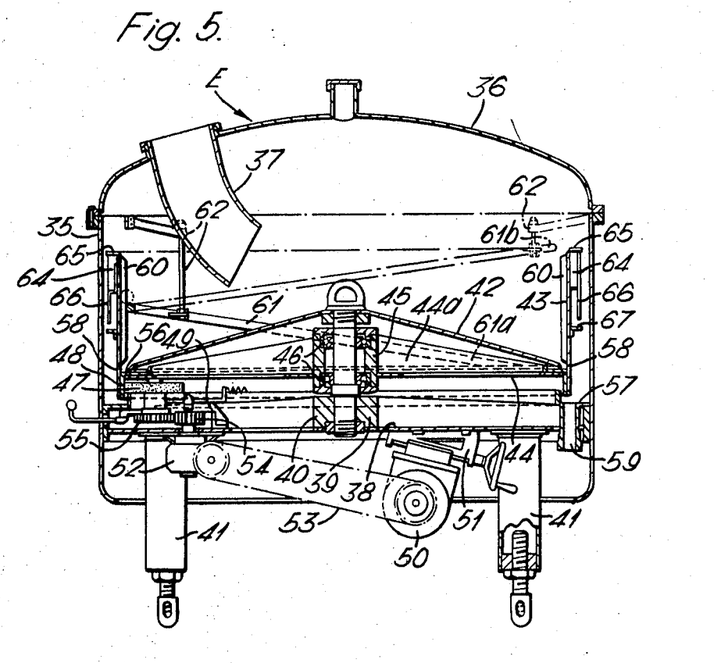
FIG. 5 depicts a sectional view taken along the line P—P in FIG. 4.
Figure 6:
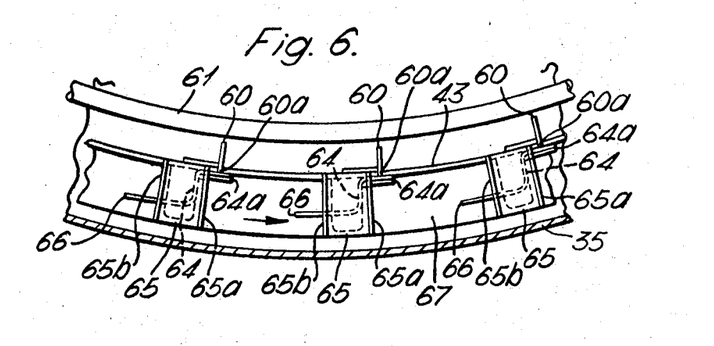
FIG. 6 illustrates an enlarged view in horizontal section showing part of an inner cylinder and an outer cylinder where bottles are transferred from inside the inner cylinder to outside.
Figure 7:
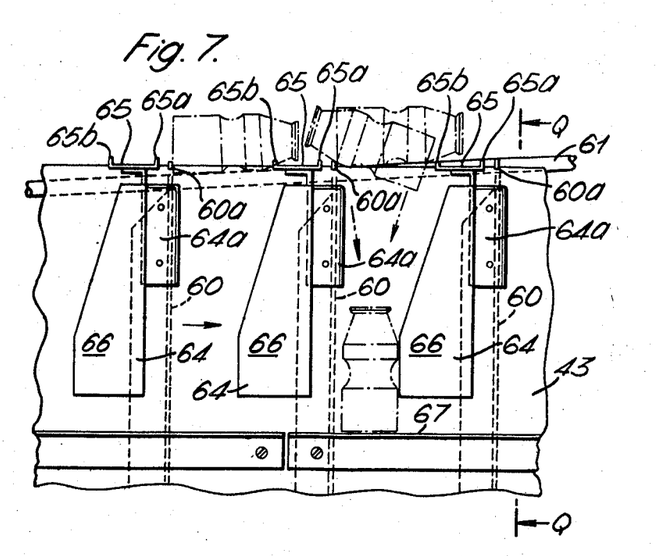
FIG. 7 shows a front development of FIG. 6 with the outer cylinder eliminated.
Figure 8:
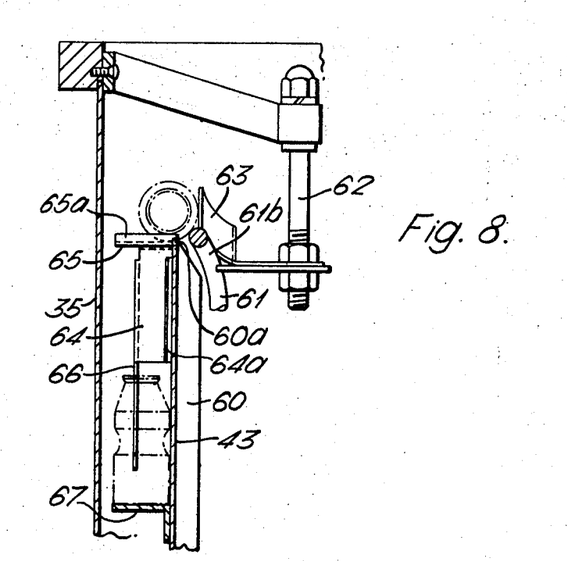
FIG. 8 depicts a view in section taken along the line Q—Q in FIG. 7.

The storage tank B, particularly a discharge device which is an important part thereof, is shown in FIGS. 2 and 3. With reference to these drawings, a short cylindrical portion 1 extends downward from the bottom wall of the storage tank B. The bottom plate 2 of the cylindrical portion 1 is secured by bolts and nuts to a flange 3 attached to the lower end of the cylindrical portion 1. A discharge outlet 4 nearly rectangular in section is formed in the bottom plate 2 on one side and has a chute 5 fitted therein tightly and extending outward obliquely. An upright drive shaft 7 is coaxial with the cylindrical portion 1 and extends through the bottom plate 2. A bearing box 8 welded to the bottom plate 2 houses upper and lower bearings 13 and 14. Attached to the bottom plate 2 of the cylindrical portion 1 is a frame, U-shaped in cross section, in which a motor 10 and a reduction gear 11 are disposed. An electromagnetic clutch 12 is included in a transmission system for transmitting the rotation of the motor 10 to the drive shaft 7 by way of the reduction gear 11 and is controlled by the photoelectric tube means on the aligning machine E for detecting the amount of bottles.

Rotatably mounted on the upper end of the drive shaft 7 by means of a bearing 6 is an umbrella-like member 15 including a slanting portion 15a and a vertical portion 15b. The umbrella-like member 15 has a bearing box 16 welded to its upper end centrally thereof and a rotary disc 17 welded to an upper part of the vertical portion 15b. The rotary disc 17 has a diameter slightly smaller than the inner diameter of the cylindrical portion 1 and formed at its center with an opening in conformity with the outer periphery of the umbrella-like member 15. The vertical portion 15b of the umbrella-like member 15 fits into the opening for welding to the disc. A projection 18 of an inverted V-shaped cross section is secured to the disc 17 and extends in a radial direction. Part of the disc 17 is cut out to provide an opening 19 for dropping the bottles, which may alternatively be in the form of a hole. A sector-like plate 20 for controlling the area of the opening 19 is slidable on arcuate guides 21 and 22. The control plate 20 is formed along its inner edge with several holes 23, and a bolt 24 is passed through one of the holes 23 to fasten the plate 20 to the guide 22 and the disc 17 with a nut at the controlled position. Welded to the lower part of inner face of vertical portion 15b is an internal gear 25 meshing with two pinions 26, which in turn mesh with a center gear 27 secured to the upper end of the bearing box 8. The shafts 28 of the pinions are supported at their upper ends by a horizontal bracket 29 fixed to the drive shaft 7.

An annular member 30 disposed under the umbrella-like member 15 is somewhat smaller in diameter than the umbrella-like member 15 and extends upwardly slightly beyond the lower end of the vertical portion 15b of the umbrella-like member 15. A support 31 in the form of a doughnut is welded to the lower end of inner face of the annular member 30 and receives the lower ends of the pinion shafts 28. Four upright blades 32 made of a resilient material extend radially from the annular member 30 and have such length that they almost come into contact with the inner face of the cylindrical portion 1. The resilient material may preferably be Neoprene (polychloroprene). The number of the blades 32 may vary as desired; the more, the better.

In the foregoing construction, the disc 17 and the blades 32 are driven in a counterclockwise direction in FIG. 2, and the former is faster than the latter. More specifically, the rotation of the drive shaft 7 is transmitted to the blades 32 by way of the bracket 29 and the pinion shafts 28, while it is delivered to the disc 17 through the bracket 29, pinions 26 and internal gear 25. The disc 17 and blades 32 need not be driven in the same direction but may be driven in reverse directions. Further, the disc 17 need not be driven at a higher speed than the blades 32, but may be rotated at a lower speed. However, either one may preferably be faster than the other to eliminate variation in the amount of discharge.

A great number of bottles supplied from the air chute C into the tank B are led along the slanting bottom to the cylindrical portion 1 and collected on the disc 17 and then smoothly dropped through the opening 19 onto the bottom plate 2, one after another, by the rotation of the disc 17. The bottles are thereafter pushed toward the discharge outlet 4 by the blades 32 and finally sent out from the discharge chute 5 approximately at a constant rate.

Without the disc 17, the bottles would be entangled with one another in a complicated manner and block the outlet 4, preventing themselves from dropping smoothly. In the event the rotating blade should hit the bottles blocking the outlet 4, some bottles would then be pressed against the edge of the outlet 4 and broken. In accordance with the apparatus described above, however, the bottles are first received by the rotary disc 17 at the upper portion and then uniformly and successively drop through the opening 19 onto the bottom plate 2 of the cylindrical portion 1 as the disc 17 goes on rotating. The bottles are thereafter brought to the discharge outlet 4 by the rotary blades 32, from which they are sent out substantially at a constant rate without breakage.

Now with reference to FIGS. 4 to 8 showing a bottle aligning machine E, a fixed outer cylinder serving as a casing is indicated at 35 and its cover, at 36. A supply chute 37 extending obliquely from one side of the cover is connected to the discharge chute 5 of the aforementioned tank B. At the center of a bottom frame 38 there is provided a boss 39 to which a vertical shaft 40 is fixed. Extendible legs 41 are attached to the bottom frame 38. A conical bottle rolling floor 42 having a polished upper surface is secured to the top of the vertical shaft 40. A rotary inner cylinder 43 coaxial with the fixed outer cylinder 35 has a slightly smaller diameter and a bottom frame 44 provided with radial members 44a with ribs. The center boss 45 of the bottom frame is mounted on the vertical shaft 40 by means of bearings 46. A friction roller 47 is in contact with a ring 48 welded to the lower end of inner face of the inner cylinder 43. A friction roller supporting member 49 is fixed to the bottom frame 38. A motor 50 is fixed to the under face of the bottom frame 38 by an adjustable support 51. Worm reduction means 52 is directly fixed to the under face of the bottom frame 38. A chain 53 transmits the torque of the motor 50 to the reduction means. A gear 54 connected to the reduction means 52 and projecting above the bottom frame 38 meshes with a gear 55 fixedly mounted on the lower end of shaft of the friction roller 47. A trough 56 of an L-shaped cross-section is welded to the bottom frame 44 along the outer periphery of the upper surface thereof. The peripheral edge of the conical floor 42 extends over the trough. At an intermediate position between the inner cylinder 43 and the bottom frame 38, a trough 57 is welded to the inner surface of the outer cylinder 35. The lower end of the inner cylinder 43 is disposed above the trough 57. A sterilizing liquid received by the trough 56 flows through a hole 58 formed in the inner cylinder 43 into the trough 57. The trough 57 is provided with a drain 59.

Inner drive projections 60 are fixed to the inner circumferential surface of the inner cylinder 43 and are spaced apart from each other by a distance slightly greater than the length of the bottle. Each projection has a width approximately corresponding to the radius of the bottle and the upper end thereof projects slightly above the upper end of the inner cylinder 43 with the lower end disposed approximately at the same level as the peripheral edge of the conical floor 42. A projecting portion 60a extends from the upper end of the inner drive projection 60 and is positioned on the upper end of the inner cylinder 43.

A guide rail 61 of a circular cross section extends along the inner periphery of the row of the inner drive projections 60 and has more than a semicircular length as seen in plan view. The upper end of the guide rail is positioned slightly above the upper end of the inner cylinder 43 and the lower end thereof is located at the lower end of the conical floor 42. The lower end and upper end of the guide rail 61 are indicated at 61a and 61b respectively. The lower end 61a, pressed to a flat form, is riveted down to the floor 42. Hangers 62 are secured to the upper edge of the outer cylinder 35. A bottle pusher 63 projects obliquely outwards along the upper end of the guide rail 61 and is secured to one of the hangers 62.

On the outer circumferential surface of the inner cylinder 43 at a position slightly to the rear, as viewed with respect to the direction or rotation of the inner cylinder 43, from the position corresponding to that of each of the inner drive projections 60 is disposed an outer projection 64 which has a width approximately equal to half the distance between the inner cylinder 43 and outer cylinder 35. The upper end of the projection 64 is positioned slightly below the upper end of the inner cylinder 43, the lower end being substantially above the level of the middle portion of the inner cylinder 43. The securing portion 64a of the outer projection 64 is spot-welded to the outer face of the inner cylinder 43. A U-shaped clearing member 65 secured to the upper end of each outer projection 64 extends toward the outer cylinder 35 and has a front upright portion 65a and a rear upright portion 65b with respect to the rotational direction. The outer projection 64 is bent at a right angle to provide a guide 66 which extends downwardly below the outer projection 64, the side edge thereof slanting backward.

Below the outer projections 64 there is disposed a bottle position floor 67 which is welded to the outer circumferential surface of the inner cylinder 43 at a level slightly below the middle portion of the height. The outer cylinder 35 is formed with a bottle exit 68 to which is connected a bottle discharge guide 69. Part of the discharge guide 69 extends into the interior through the exit 68 and one side plate thereof serves as a barrier 70 which blocks a portion above the bottle position floor 67. Indicated at 71 is photoelectric tube means comprising a projector and a receiver for detecting the quantity of the bottles within the aligning machine (see FIG. 4). The photoelectric tube means 71 is mounted on an arm 72 extending inward from the upper end of the outer cylinder 35 and is positioned at a right angle to the slanting face of the conical floor 42.

In the foregoing embodiment, a great number of bottles charged in through the bottle supply chute 37 first drop onto the conical floor 42 and roll down the sloping surface up to its peripheral edge, where there is provided the inner cylinder 43 which is constantly revolving. Accordingly, the bottles are automatically trapped in between respective inner drive projection 60 and driven in a counterclockwise direction by the inner drive projections 60 up to the lower end 61a of the guide rail 61. The stationary guide rail 61 extends along the row of the inner drive projections 60 in slanting manner, whereas the inner projections 60 have a height approximately equal to the vertical rise of the guide rail 61 and are in rotation. The projections 60 therefore push the bottles upwardly along the guide rail 61 until they reach the upper end 61b thereof, when the bottles, guided by the pusher 63, are forced beyond the upper end of the inner cylinder 43 to drop outside (see FIG. 3). At this time, the bottle whose mouth is directed toward the direction of the travel is sent upward along the slanting guide rail 61 with the bottle bottom kept in contact with the inner drive projections 60. When the bottle is to be finally moved beyond the upper end of the inner cylinder 43 along the projecting portions 60a, the shoulder of the bottle comes into contact with the rear upright portion 65b of the preceding clearing member 65 disposed outside the inner cylinder 43, so that the bottle drops onto the position floor 67 correctly in the upstanding state. On the other hand, in the case where the mouth of a bottle is directed toward a direction opposite to that of the direction of travel, the bottle is moved upward along the slanting guide rail 61 with the mouth kept in contact with the inner drive projection 60. When the bottle finally reaches the projection portion 60a at the upper end of the inner projection, the bottle mouth, being smaller than the main portion of the bottle in diameter, does not engage, but clears the projecting portion 60a and moves beyond the upper edge of the inner cylinder 43. However, since the inner cylinder 43 goes on rotating, the bottle is substantially moved backward, with the result that the shoulder of the bottle strikes the front upright portion 65a of the clearing member 35 which is positioned behind the bottle. Just as in the above-mentioned case, the bottle consequently drops with its bottom side down onto the bottom position floor 67 correctly in the upstanding state. In this manner, the bottles pushed forward by the inner drive projections 60 and sent upward along the slanting guide rail 61 are delivered one after another from inside the inner cylinder 43 to the outside and placed in a normal upright position on the bottle position floor 67 when dropping thereon. Due to the rotation of the inner cylinder 43, the bottles on the floor 67 are moved counterclockwise. When brought forward halfway of a revolution, the bottles strike the barrier 70, and through the exit 68 formed in the outer cylinder 35 and discharge guide 69, they are delivered onto a belt conveyor L.

Figure 9:
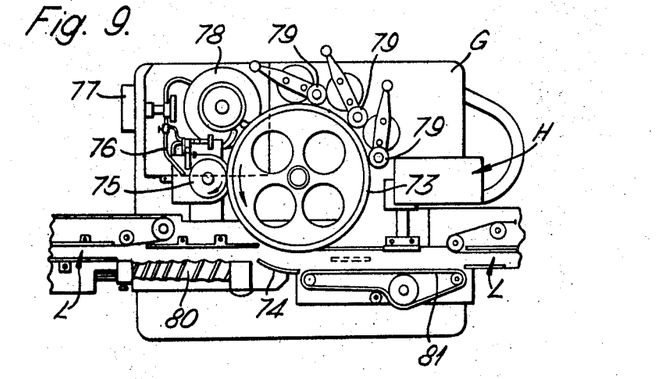
FIG. 9 is a plan view of a printing press which is one of the components in FIG. 1.

The printing press G for providing suitable printing on the side faces of the upright bottles aligned may be a known offset printing machine. The structure of the machine will be described below briefly. With reference to FIG. 9, an offset rubber drum 73 has a peripheral surface, part of which is positioned in the path of travel of a row of the bottles on the conveyor L. An arcuate pressing plate 74 is spaced apart from the rubber drum 73 in facing relation by a distance for interposing a bottle therebetween. A nozzle 76 for applying ink to a plate drum 75 is connected to a pump 77. An ink pot is indicated at 78; a cleaning roller for wiping off excess ink on the rubber drum, at 79; a timing screw for controlling the distance between the bottles to be continuously fed to the printing press G, at 80; and a belt for sending out the bottles after printing, at 81.

The ink applied to the plate drum 75 by the nozzle 76 is further applied to the offset rubber drum 73. On the other hand, the upright bottles sent forward in a row from the aligning machine E by the conveyor L are carried forward while being rotated by contact with the rubber drum 73, whereby they are printed on the side thereof by the rubber drum 73. After printing, the bottles are fed to the bottling machine I for the subsequent filling operation as already described.

I claim:

1. In a liquid packaging arrangement including a system wherein bottles are sent out by a bottle aligining machine (E) in a row so that they may be further processed, said system having a hollow vertical storage tank (B) to assure a constant supply of bottles to the aligning machine, said system further having
   a. an injection molding machine for producing molded bottles;
   b. transfer means for receiving bottles from said injection molding machine;
   c. a storage tank connected to said transfer means;
   d. bottle aligning means fed by said storage tank;
   e. a conveyor receiving said aligned bottles; and, f. a printing press in the path of travel of said conveyor disposed to print on said bottles, the improvement therein wherein said storage transfer tank comprises:
1. a short cylindrical portion (1) extending downwards from said tank;
2. a discharge outlet (4) defined in said cylindrical portion on one side thereof;
3. an upright drive shaft (7) coaxial with said cylindrical portion (1) and drive means (10, 11) to rotate said shaft;
4. an umbrella-like member (15) mounted on the upper end of said drive shaft including an outer protion (15b);
5. a rotary disc (17) attached to said outer portion (15b), the outer diameter of said disc (17) being slightly smaller than the inner diameter of said cylindrical portion (1), said disc (17) having a radial opening (19) sized to permit passage of one bottle therethrough; and,
6. at least one radial blade (32) disposed under said umbrella-like member (15) said blade sweeping any bottle passing through said opening (19) into the discharge outlet (4).

* * * * *